US012452608B2

(12) United States Patent
Meng et al.

(10) Patent No.: US 12,452,608 B2
(45) Date of Patent: Oct. 21, 2025

(54) DOUBLE-SIDED SPEAKER DEVICE

(71) Applicant: AAC Microtech (Changzhou) Co., Ltd., Jiangsu (CN)

(72) Inventors: Yiming Meng, Changzhou (CN); Wei Liu, Changzhou (CN); Peilin Yang, Changzhou (CN); Yanhao Feng, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 273 days.

(21) Appl. No.: 18/313,399

(22) Filed: May 8, 2023

(65) Prior Publication Data

US 2024/0284115 A1 Aug. 22, 2024

Related U.S. Application Data

(63) Continuation of application No. PCT/CN2023/076316, filed on Feb. 16, 2023.

(51) Int. Cl.

| | |
|---|---|
| ***H04R 9/06*** | (2006.01) |
| ***H04R 7/18*** | (2006.01) |
| ***H04R 9/02*** | (2006.01) |

(52) U.S. Cl.

CPC ............... *H04R 9/063* (2013.01); *H04R 7/18* (2013.01); *H04R 9/025* (2013.01); *H04R 2400/11* (2013.01)

(58) Field of Classification Search

CPC . H04R 9/02; H04R 9/04; H04R 9/063; H04R 1/24

See application file for complete search history.

(56) References Cited

FOREIGN PATENT DOCUMENTS

WO WO-2020020129 A1 * 1/2020 ............... H04R 9/06

* cited by examiner

*Primary Examiner* — Sunita Joshi
(74) *Attorney, Agent, or Firm* — Wiersch Law Group

(57) ABSTRACT

A coaxial double-sided speaker device includes a frame, first and second vibration units fixed to two opposite sides of the frame, a magnetic circuit unit, and a front cover fixed to the frame and provided under the first diaphragm. The first vibration unit includes a first diaphragm fixed to the frame and a first voice coil. The second vibration unit includes a second diaphragm fixed to frame and a second voice coil. The front cover and first diaphragm are spaced apart to form a first front cavity. The frame is provided with a sound leading channel including first and second openings respectively toward the first and second diaphragms. The first opening communicates with the first front cavity. The second opening is located at periphery of the second diaphragm. The double-sided speaker device has a higher volume, a smaller product size and a higher utilization rate of the magnetic circuit unit.

9 Claims, 4 Drawing Sheets

C-C

DOUBLE-SIDED SPEAKER DEVICE

TECHNICAL FIELD

The disclosure relates to the field of electro-acoustic conversion, and in particular to a double-sided speaker device.

BACKGROUND

A speaker device includes a single-sided speaker device and a double-sided speaker device. Compared with the single-sided speaker device, the double-sided speaker device has a greater sound pressure level (SPL) and better acoustic performance.

In related art, the double-sided speaker device is achieved by simply stacking another single-sided speaker unit on a back of one single-sided speaker unit, thus causing a large product size. Sound channels of the two single-sided speaker devices are located at different sides, such that the volume of the double-sided speaker device is undesirable and the optimal tone quality cannot be achieved. The two single-sided speaker devices each have an independent magnetic circuit unit. Consequently, the single magnetic circuit unit cannot be used maximally, and the material cost cannot be reduced.

Therefore, it is necessary to provide a novel double-sided speaker device to solve the above technical problems.

SUMMARY

In view of the above technical problems, an objective of the disclosure is to provide a double-sided speaker device with a higher volume, a smaller product size, and a higher utilization rate of the magnetic circuit unit.

To achieve the above objective, the disclosure provides a double-sided speaker device. The double-sided speaker device includes a frame, a first vibration unit and a second vibration unit respectively fixed to two opposite sides of the frame, a magnetic circuit unit provided between the first vibration unit and the second vibration unit, and a front cover fixed to the frame and provided under the first diaphragm. The first vibration unit includes a first diaphragm fixed to the frame, and a first voice coil configured to drive the first diaphragm to vibrate to produce sound; and the second vibration unit comprises a second diaphragm fixed to the frame, and a second voice coil configured to drive the second diaphragm to vibrate to produce sound. The front cover and the first diaphragm are spaced apart from each other to form a first front cavity, and the frame includes at least one sound leading channel penetrating the frame. The at least one sound leading channel each includes a first opening toward the first diaphragm and a second opening toward the second diaphragm. The first opening communicates with the first front cavity, and the second opening is located at a periphery of the second diaphragm.

As an improvement, the at least one sound leading channels each penetrates through the frame along a vibrating direction.

As an improvement, the at least one sound leading channel includes at least two sound leading channels that are spaced apart from each other.

As an improvement, the frame includes a first frame fixedly connected to the first diaphragm, and a second frame fixedly connected to the second diaphragm and fixed with the first frame. One sound leading channel of the at least one sound leading channel comprises a first sound leading channel and a second sound leading channel. The first frame is provided with the first sound leading channel penetrating the first frame, the second frame is provided with the second sound leading channel penetrating the second frame, the first sound leading channel communicates with the first front cavity, and the first sound leading channel communicates with the second sound leading channel to form the sound leading channel.

As an improvement, the first diaphragm is fixed to an inner edge of the first frame. The front cover is fixed to an outer edge of the first frame. The first sound leading channel is formed between the inner edge and the outer edge of the first frame.

As an improvement, the second diaphragm is fixed to an inner edge of the second frame. The second sound leading channel is formed between the inner edge and an outer edge of the second frame.

As an improvement, the magnetic circuit unit includes a yoke fixed to the frame, a magnet accommodated in the yoke and spaced apart from the yoke, and a fixing member provided between the yoke and the magnet and supporting the magnet on the yoke. A first magnetic gap is formed between the magnet and an end of the yoke close to the first diaphragm. A second magnetic gap is formed between the magnet and an end of the yoke close to the second diaphragm. The first vibration unit further includes a first holder fixed to a side of the first diaphragm facing toward the magnet. The first voice coil is inserted into the first magnetic gap through the first holder. The second vibration unit further includes a second holder fixed to a side of the second diaphragm facing toward the magnet. The second voice coil is inserted into the second magnetic gap through the second holder.

As an improvement, a plurality of support beams each extending and fixed to an outer side of the yoke is provided on the frame. The plurality of support beams is spaced apart from each other along a periphery of the yoke.

As an improvement, the first diaphragm includes a first dome fixed with the first holder, a first suspension surrounding the first dome and fixed to the first frame, and a first extension wall extending toward the second diaphragm from the first dome. The first vibration unit further includes a first support member fixed to an end of the first extension wall away from the first diaphragm. The second diaphragm includes a second dome fixed with the second holder, a second suspension surrounding the second dome and fixed to the second frame, and a second extension wall extending towards the first diaphragm from the second dome. The second vibration unit further includes a second support member fixed to an end of the second extension wall away from the second diaphragm. A projection of the first support member along a vibrating direction and a projection of the second support member along the vibrating direction are spaced apart from each other.

As an improvement, the projection of the first support member along the vibrating direction is located between two adjacent support beams of the plurality of support beams. The projection of the second support member along the vibrating direction is located between two adjacent support beams of the plurality of support beams.

Compared with the related art, according to the double-sided speaker device provided by the disclosure, the two vibration units have a same sound direction, which increases a volume of the double-sided speaker device, and effectively improves a tone quality. The two vibration units share one magnetic circuit, which not only improves a utilization rate of the magnetic circuit unit, but also makes the double-sided speaker device structurally compact, thereby reducing a material cost.

BRIEF DESCRIPTION OF DRAWINGS

To describe the technical solutions in the embodiments of the disclosure more clearly, the drawings required for describing the embodiments are briefly described below. Apparently, the drawings described below are merely some embodiments of the disclosure, and those of ordinary skill in the art may still obtain other drawings based on these drawings without creative efforts.

DETAILED DESCRIPTION OF EMBODIMENTS

The technical solutions in the embodiments of the disclosure are clearly and completely described below with reference to the drawings in the embodiments of the disclosure. Apparently, the embodiments described are a part, rather than all of the embodiments of the disclosure. All other embodiments obtained by those of ordinary skill in the art based on the embodiments in the disclosure without creative efforts should fall within the protection scope of the disclosure.

Figure 1:
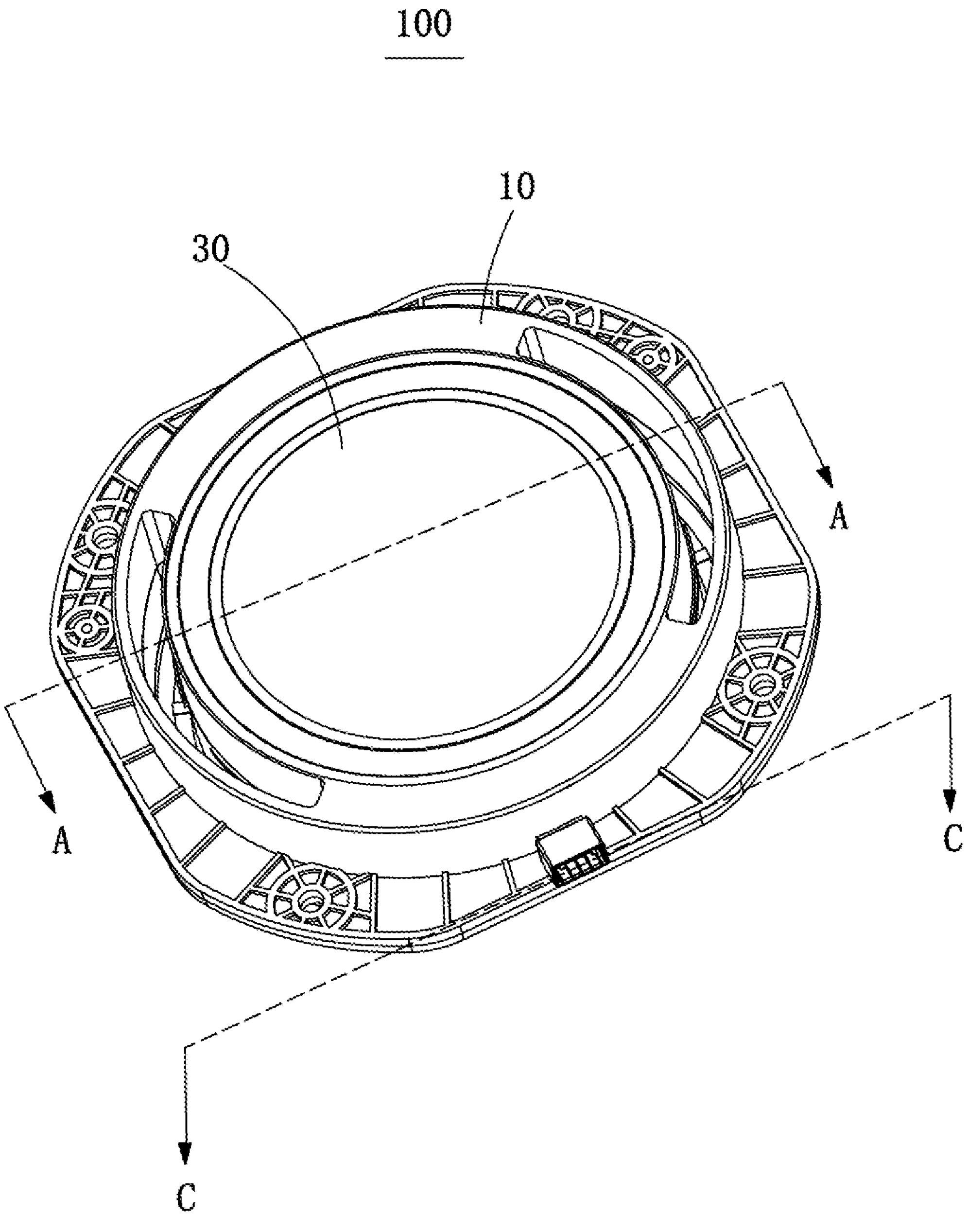
FIG. 1 is a perspective view of a double-sided speaker device according to the disclosure.
Figure 2:
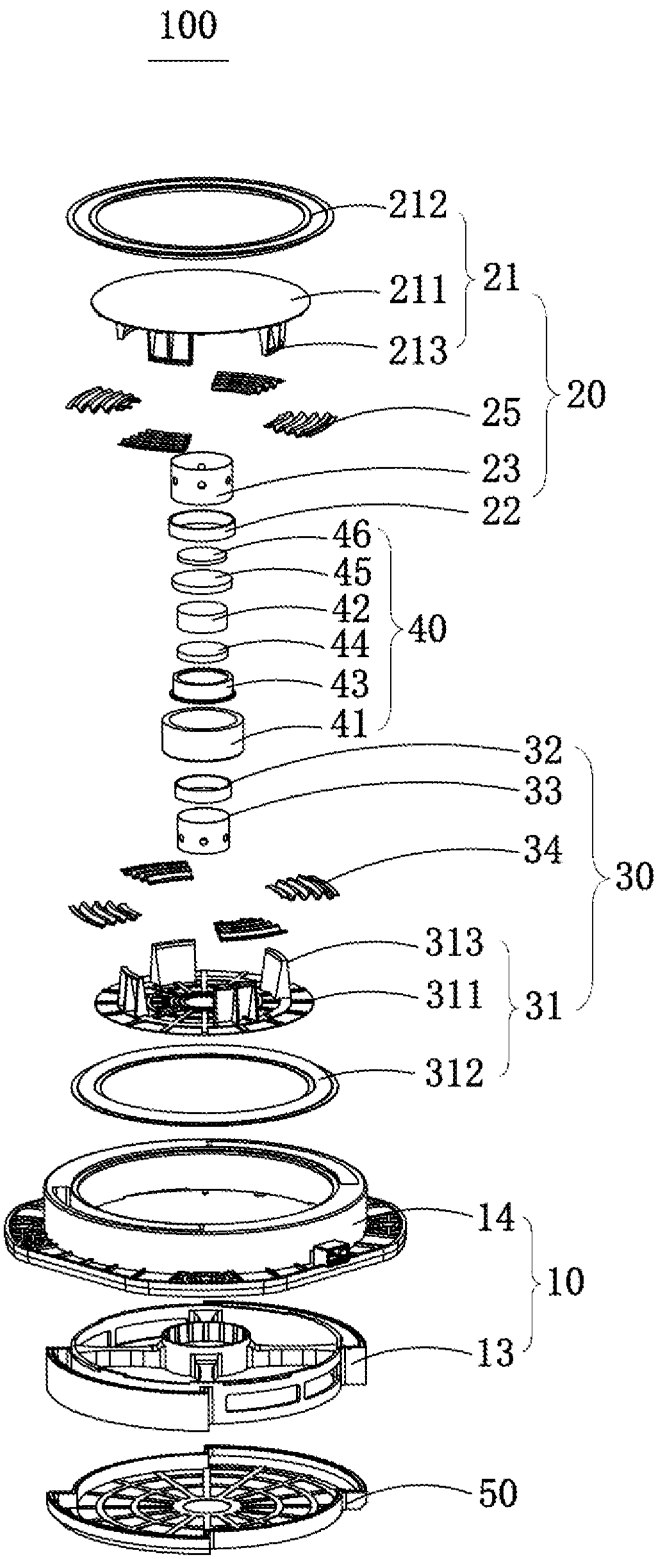
FIG. 2 is an exploded view of a double-sided speaker device according to the disclosure.
Figure 3:
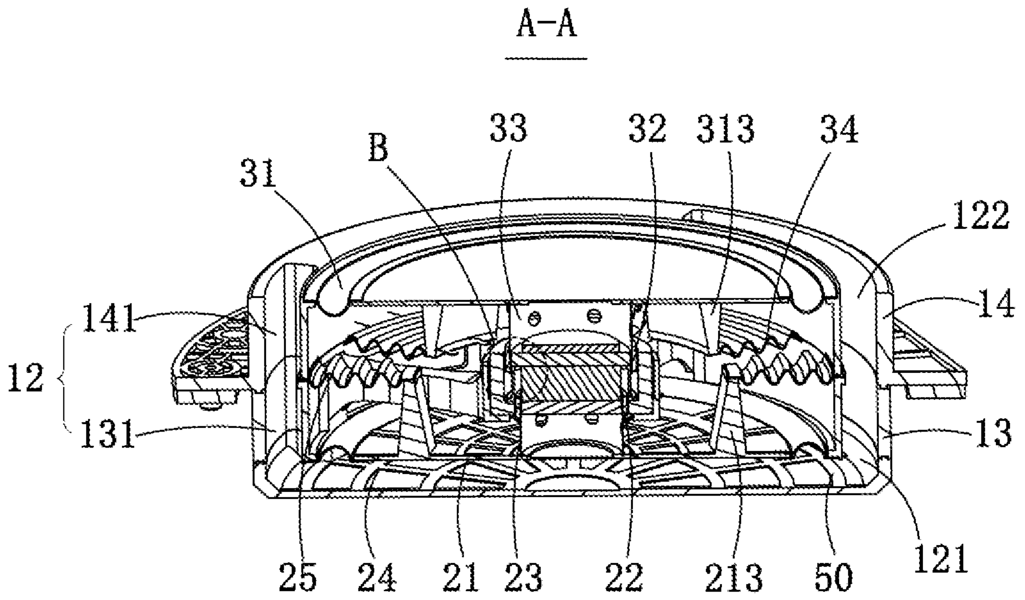
FIG. 3 is a sectional view along a line A-A shown in FIG. 1.
Figure 4:
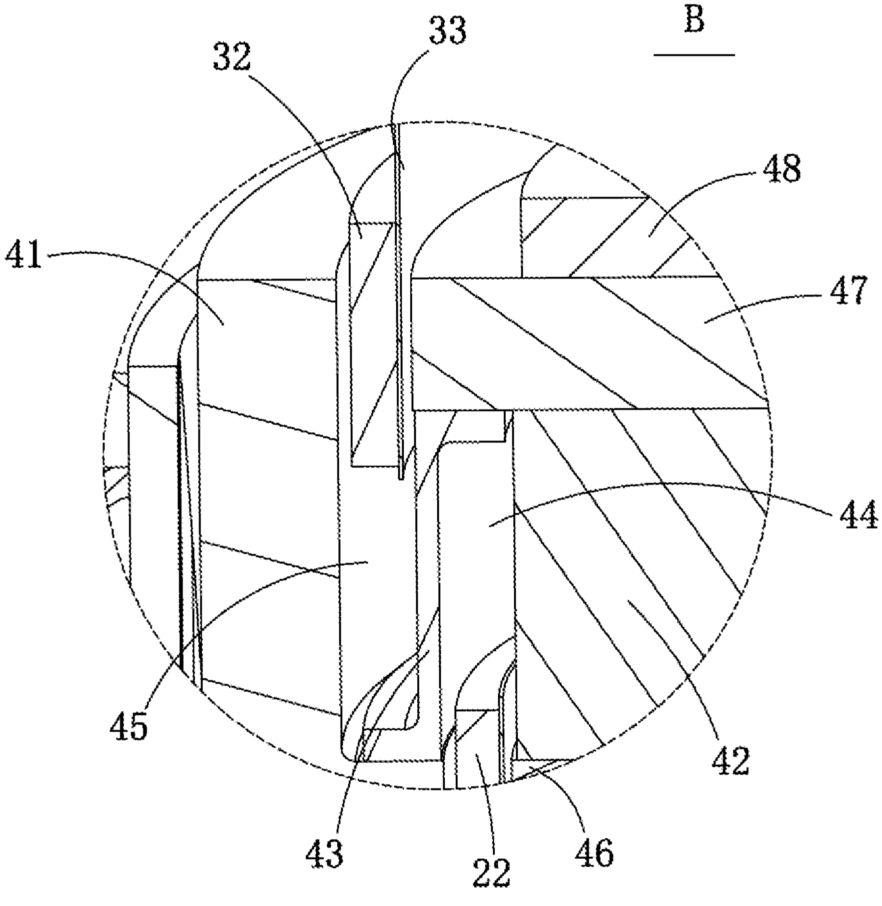
FIG. 4 is an enlarged view of B shown in FIG. 3.
Figure 5:
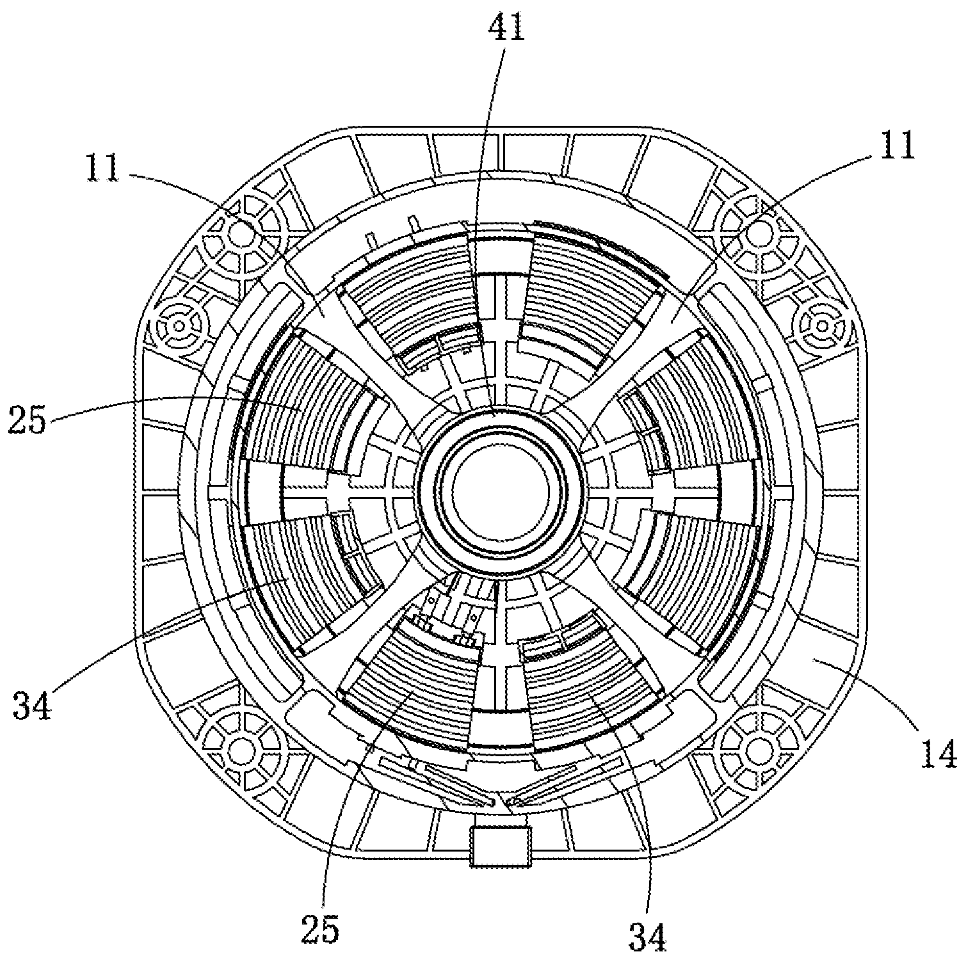
FIG. 5 is a sectional view along a line C-C shown in FIG. 1.

As shown in FIGS. 1-5, the disclosure provides a coaxial double-sided speaker device 100, including a frame 10, a first vibration unit 20 and a second vibration unit 30 respectively fixed in to two opposite sides of the frame 10, and a magnetic circuit unit 40 provided between the first vibration unit 20 and the second vibration unit 30.

The first vibration unit 20 includes a first diaphragm 21 fixed to the frame 10 and a first voice coil 22 configured to drive the first diaphragm 21 to vibrate to produce sound.

The second vibration unit 30 includes a second diaphragm 31 fixed to the frame 10 and a second voice coil 32 configured to drive the second diaphragm 31 to vibrate to produce sound.

The magnetic circuit unit 40 includes a yoke 41 fixed to the frame 10, a magnet 42 accommodated in the yoke 41 and spaced apart from the yoke 41, and a fixing member 43 provided between the yoke 41 and the magnet 42 and supporting the magnet 42 on the yoke 41. A first magnetic gap 44 is formed between an end of the yoke 41 close to the first diaphragm 21 and the magnet 42. A second magnetic gap 45 is formed between an end of the yoke 41 close to the second diaphragm 31 and the magnet 42. In some embodiment, a plurality of support beams 11 each extending and fixed to an outer side of the yoke 41 is provided on the frame 10. The plurality of support beams 11 is spaced apart from each other along a periphery of the yoke 41. The yoke 41 fixes the magnetic circuit unit 40 to the frame 10 through the support beams 11. In order to enhance a magnetic field of the magnetic circuit unit 40, the magnetic circuit unit 40 includes a first pole plate 46 provided at a side of the magnet 42 facing toward the first diaphragm 21, a second pole plate 47 provided at a side of the magnet 42 facing toward the second diaphragm 31, and a third pole plate 48 provided at a side of the second pole plate 47 facing toward the second diaphragm 31.

The first vibration unit 20 includes a first holder 23 fixed to a side of the first diaphragm 21 toward the magnet 42. The first voice coil 22 is inserted into the first magnetic gap 44 through the first holder 23. The second vibration unit 30 includes a second holder 33 fixed to a side of the second diaphragm 31 facing toward the magnet 42. The second voice coil 32 is inserted into the second magnetic gap 45 through the second holder 33.

The double-sided speaker device 100 includes a front cover 50 fixed to the frame 10 and provided under the first diaphragm 21. The front cover 50 and the first diaphragm 21 are spaced apart from each other to form a first front cavity 24. The frame 10 is provided with a sound leading channel 12 penetrating the frame 10. The sound leading channel 12 includes a first opening 121 toward the first diaphragm 21 and a second opening 122 toward the second diaphragm 31. The first opening 121 communicates with the first front cavity 24. The second opening 122 is located at a periphery of the second diaphragm 31. Therefore, sound wave produced by vibration of the first diaphragm 21 are transmitted to the periphery of the second diaphragm 31 through the sound leading channels 12, which effectively improves the volume of the double-sided speaker device 100. It can be understood that the sound leading channel 12 penetrate through the frame 10 along a vibrating direction. The frame 10 includes at least two sound leading channels 12. The at least two sound leading channels 12 are spaced apart from each other.

In some embodiments, the frame 10 includes a first frame 13 fixedly connected to the first diaphragm 21, and a second frame 14 fixedly connected to the second diaphragm 31 and fixed with the first frame 13. The first frame 13 is provided with a first sound leading channel 131 penetrating the first frame 13. The second frame 14 is provided with a second sound leading channel 141 penetrating the second frame 14. The first sound leading channel 131 communicates with the first front cavity 24. The first sound leading channel 131 communicates with the second sound leading channel 141 to form the sound leading channel 12.

It is to be understood that the support beams 11 extend from the first frame 13 and are fixed to the yoke 41. The first diaphragm 21 is fixed to an inner edge of the first frame 13. The front cover 50 is fixed to an outer edge of the first frame 13. The first sound leading channel 131 is formed between the inner edge and the outer edge of the first frame 13. The second diaphragm 31 is fixed to an inner edge of the second frame 14. The second sound leading channel 141 is formed between the inner edge and an outer edge of the second frame 14.

In some embodiments, the first diaphragm 21 includes a first dome 211 fixed with the first holder 23, a first suspension 212 surrounding the first dome 211 and fixed to the first frame 13, and a first extension wall 213 extending toward the second diaphragm 31 from the first dome 211. The first vibration unit 20 includes a first support member 25 fixed to an end of the first extension wall 213 away from the first diaphragm 21. The second diaphragm 31 includes a second dome 311 fixed with the second holder 33, a second suspension 312 surrounding the second dome 311 and fixed to the second frame 14, and a second extension wall 313 extending towards the first diaphragm 21 from the second dome 311. The second vibration unit 30 includes a second support member 34 fixed to an end of the second extension wall 313 away from the second diaphragm 31. A projection of the first support member 25 along the vibrating direction and a projection of the second support member 34 along the vibrating direction are spaced apart from each other. In some embodiments, the projection of the first support member 25 along the vibrating direction is located between two adjacent ones of the support beams 11. The projection of the second support member 34 along the vibrating direction is located between two adjacent ones of the support beams 11.

Compared with the related art, the double-sided speaker device provided by the disclosure includes a frame, a first vibration unit and a second vibration unit respectively fixed to two opposite sides of the frame, and a magnetic circuit unit provided between the first vibration unit and the second vibration unit. The first vibration unit includes a first diaphragm fixed to the frame and a first voice coil configured to drive the first diaphragm to vibrate and produce sound. The second vibration unit includes a second diaphragm fixed to the frame and a second voice coil configured to drive the second diaphragm to vibrate to produce sound. The double-sided speaker device includes a front cover fixed to the frame and provided under the first diaphragm. The front cover and the first diaphragm are spaced apart from each other to form a first front cavity. The frame is provided with the sound leading channel penetrating the frame. The sound leading channel includes a first opening toward the first diaphragm and a second opening toward the second diaphragm. The first opening communicates with the first front cavity. The second opening is located at a periphery of the second diaphragm. According to the double-sided speaker device provided by the disclosure, the two vibration units have a same sound direction, which increases a volume of the double-sided speaker device, and effectively improves a tone quality. The two vibration units share one magnetic circuit, which improves a utilization rate of the magnetic circuit unit and makes the double-sided speaker device structurally compact, thereby reducing a material cost.

The above described are merely implementations of the disclosure. It should be noted here that those of ordinary skill in the art may make improvements without departing from the concept of the disclosure, but such improvements should fall within the protection scope of the disclosure.

What is claimed is:

1. A double-sided speaker device, comprising:

a frame;

a first vibration unit and a second vibration unit respectively fixed to two opposite sides of the frame, wherein the first vibration unit comprises a first diaphragm fixed to the frame, and a first voice coil configured to drive the first diaphragm to vibrate to produce sound; and the second vibration unit comprises a second diaphragm fixed to the frame, and a second voice coil configured to drive the second diaphragm to vibrate to produce sound;

a magnetic circuit unit provided between the first vibration unit and the second vibration unit; and a front cover fixed to the frame and provided under the first diaphragm, wherein the front cover and the first diaphragm are spaced apart from each other to form a first front cavity, and the frame comprises at least one sound leading channel penetrating the frame, wherein the at least one sound leading channel each comprises a first opening toward the first diaphragm and a second opening toward the second diaphragm, wherein the first opening communicates with the first front cavity, and the second opening is located at a periphery of the second diaphragm;

the frame comprises a first frame fixedly connected to the first diaphragm and a second frame fixedly connected to the second diaphragm and fixed with the first frame, and one sound leading channel of the at least one sound leading channel comprises a first sound leading channel and a second sound leading channel, wherein the first frame is provided with the first sound leading channel penetrating the first frame, the second frame is provided with the second sound leading channel penetrating the second frame, the first sound leading channel communicates with the first front cavity, and the first sound leading channel communicates with the second sound leading channel to form the one sound leading channel.

2. The double-sided speaker device as described in claim 1, wherein the at least one sound leading channel each penetrates through the frame along a vibrating direction.

3. The double-sided speaker device as described in claim 1, wherein at least one sound leading channel comprises at least two sound leading channels that are spaced apart from each other.

4. The double-sided speaker device as described in claim 1, wherein the first diaphragm is fixed to an inner edge of the first frame; the front cover is fixed to an outer edge of the first frame; and the first sound leading channel is formed between the inner edge and the outer edge of the first frame.

5. The double-sided speaker device as described in claim 1, wherein the second diaphragm is fixed to an inner edge of the second frame; and the second sound leading channel is formed between the inner edge and an outer edge of the second frame.

6. The double-sided speaker device as described in claim 1, wherein the magnetic circuit unit comprises a yoke fixed to the frame, a magnet accommodated in the yoke and spaced apart from the yoke, and a fixing member provided between the yoke and the magnet and configured to support the magnet on the yoke, wherein a first magnetic gap is formed between the magnet and an end of the yoke close to the first diaphragm; a second magnetic gap is formed between the magnet and an end of the yoke close to the second diaphragm; the first vibration unit further comprises a first holder fixed to a side of the first diaphragm facing toward the magnet; the first voice coil is inserted into the first magnetic gap through the first holder; the second vibration unit further comprises a second holder fixed to a side of the second diaphragm facing toward the magnet; and the second voice coil is inserted into the second magnetic gap through the second holder.

7. The double-sided speaker device as described in claim 6, wherein a plurality of support beams each extending and fixed to an outer side of the yoke is provided on the frame; and the plurality of support beams is spaced apart from each other along a periphery of the yoke.

8. The double-sided speaker device as described in claim 7, wherein the first diaphragm comprises a first dome fixed with the first holder, a first suspension surrounding the first dome and fixed to the first frame, and a first extension wall extending toward the second diaphragm from the first dome; the first vibration unit further comprises a first support member fixed to an end of the first extension wall away from the first diaphragm; the second diaphragm comprises a second dome fixed with the second holder, a second suspension surrounding the second dome and fixed to the second frame, and a second extension wall extending towards the first diaphragm from the second dome; the second vibration unit further comprises a second support member fixed to an end of the second extension wall away from the second diaphragm; and a projection of the first support member along a vibrating direction and a projection of the second support member along the vibrating direction are spaced apart from each other.

9. The double-sided speaker device as described in claim 8, wherein the projection of the first support member along the vibrating direction is located between two adjacent support beams of the plurality of support beams; and the projection of the second support member along the vibrating direction is located between two adjacent support beams of the plurality of support beams.

* * * * *